US012415107B1

(12) United States Patent
Byrd et al.

(10) Patent No.: US 12,415,107 B1
(45) Date of Patent: Sep. 16, 2025

(54) STATIC STRUCTURE WITH LASER SYSTEM FOR NEUTRALIZING EMBERS

(71) Applicant: UIPCO, LLC, San Antonio, TX (US)

(72) Inventors: Matthew Robert Byrd, Boerne, TX (US); Dwayne Phillip Wilson, Crossroads, TX (US); Janelle Denice Dziuk, Falls City, TX (US); Ivan Ortiz, Little Elm, TX (US); Carlos J P Chavez, San Antonio, TX (US); Bradly Jay Billman, Celina, TX (US); Luis Eduardo Santana, Crowley, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 545 days.

(21) Appl. No.: 17/888,750

(22) Filed: Aug. 16, 2022

Related U.S. Application Data

(60) Provisional application No. 63/238,811, filed on Aug. 31, 2021.

(51) Int. Cl.
*A62C 3/02* (2006.01)
*A62C 37/38* (2006.01)
*A62C 99/00* (2010.01)

(52) U.S. Cl.
CPC ............ *A62C 37/38* (2013.01); *A62C 3/0278* (2013.01); *A62C 99/009* (2013.01)

(58) Field of Classification Search
CPC ......... A62C 37/38; A62C 37/40; A62C 31/03; A62C 3/0278; A62C 99/009; A62C 2/04; A62C 3/0214
See application file for complete search history.

(56) References Cited

U.S. PATENT DOCUMENTS

| | | | | |
|---|---|---|---|---|
| 7,066,273 | B2 * | 6/2006 | Tan | A62C 37/40 169/41 |
| 2013/0220647 | A1 * | 8/2013 | Leigh | A62C 3/0278 169/53 |
| 2016/0175633 | A1 * | 6/2016 | Smith | A62C 3/0214 169/61 |
| 2020/0338375 | A1 * | 10/2020 | Council | A62C 37/40 |
| 2021/0069538 | A1 * | 3/2021 | Magnone | A62C 31/24 |

OTHER PUBLICATIONS

How bright is a laser beam when viewed from the side—by Christopher Baird (Year: 2013).*

* cited by examiner

*Primary Examiner* — Tuongminh N Pham
(74) *Attorney, Agent, or Firm* — Plumsea Law Group, LLC

(57) ABSTRACT

A system for neutralizing embers is disclosed. The system includes a laser turret with a sensor array and a laser emitter configured to dispense laser energy. The laser turret can also include a control system configured to move the laser emitter. The laser control system can receive information from the sensor array and sending signals to the control system to move the laser emitter. Using these features, the laser control system can select an incoming ember based on a thermal signature associated with the incoming ember, and the laser control system can issue commands to the control system to direct the laser emitter towards the incoming ember, and the laser emitter can direct laser energy at the incoming ember. The system can also include provisions to track an ember and determine if an ember has been depleted of fuel.

20 Claims, 11 Drawing Sheets

STATIC STRUCTURE WITH LASER SYSTEM FOR NEUTRALIZING EMBERS

CROSS-REFERENCE TO RELATED APPLICATIONS

This application claims the benefit of Provisional Patent Application No. 63/238,811 filed Aug. 31, 2021, and titled "Static Structure with Laser System for Neutralizing Embers," which is incorporated by reference herein in its entirety.

BACKGROUND

1. Field of the Disclosure

The present disclosure relates generally to a static structure with a laser system for neutralizing oncoming embers from a fire. In particular, the disclosure relates to a laser system using lasers to target and disrupt embers in the air around a static structure, building or dwelling.

2. Description of Related Art

Destruction of buildings by wild fires is becoming more prevalent. The number of wild fires per year is increasing as people make greater use of developed and undeveloped areas of natural spaces. Both business, such as forestry, and personal uses, such as hunting and camping, contribute to the number of fires occurring in such outdoor spaces. With an increase in the number of users comes additional pressures upon the land, not only by increased fire risk, but also by increased numbers of less-well trained and inexperienced users. Increased pressure on use makes even a small fire a dangerous one.

Global climate change also contributes to the danger of fires in outdoor spaces by drying the fuel sources and strengthening storm winds, thus increasing the intensity of a fire. Wild fires tend to burn hotter, sending embers higher into the wind. Thus, embers are transported farther than they have been in the past, and are distributed throughout a larger area. As these hotter embers and smoke are carried further, they impinge upon more and more inhabited areas. Denser habitation means denser building, and more chance of building fires.

Defense against wild fires is difficult. Many such fires burn in areas devoid of roads. Further, such natural spaces often are devoid of on-demand water sources, such as hydrants, and there often are but few people present to fight a fire. Many structures are uninhabited for months at a time. Also, such fires may burn undetected, and so become well-established and difficult to extinguish.

Further, the close proximity of buildings in urban and suburban regions increases the likelihood that a structure fire will spread from one building to another. Just as embers may spread a wild fire, embers may spread from one structure fire to another.

There is a need in the art for a system and method that addresses the shortcomings of the prior art discussed above.

SUMMARY OF THE DISCLOSURE

The disclosure is directed to use a system that disrupts embers in the air around a static structure. The system may detect embers, sweep or scan the lasers through the sky. To prevent the embers from entering the building, the lasers may be used to burn through all of the fuel in the ember while the ember is in the air. In some embodiments, the lasers may be focused on areas of building, such as vents, where embers may enter the building.

In one aspect, the disclosure provides a static structure including a laser system comprising a laser turret. The laser turret may be disposed on the roof of the static structure, and can include a sensor array and a laser emitter configured to dispense laser energy. The laser turret can also include a control system configured to move the laser emitter. The laser control system can receive information from the sensor array and sending signals to the control system to move the laser emitter. Using these features, the laser control system can select an incoming ember based on a thermal signature associated with the incoming ember, and the laser control system can issue commands to the control system to direct the laser emitter towards the incoming ember, and the laser emitter can direct laser energy at the incoming ember.

In another aspect, the laser control system uses a camera sensor to correct the direction of the laser emitter after the incoming ember has been initially acquired by the thermal signature associated with the incoming ember.

In another aspect, the laser control system determines that a fuel level associated with the incoming ember has been depleted by sensing a discontinuity in the thermal signature of the incoming ember.

In another aspect, the laser control system determines that a fuel level associated with the incoming ember has been depleted by sensing a rapid decline in the thermal signature of the incoming ember.

In another aspect, the laser turret includes a rotating motor that rotates the laser turret with respect to the static structure.

In another aspect, the laser control system tracks multiple incoming embers and calculates a velocity and trajectory of each of the incoming embers, the laser control system selecting at least one priority ember likely to contact the static structure for initial service, and wherein the laser control system directs laser energy at the priority ember.

In another aspect, the laser control system continues to direct laser energy at the priority ember until a fuel level associated with the priority ember has been depleted.

In another aspect, the disclosure provides a method for neutralizing burning embers that may burn a building, the method comprising the steps of scanning a region adjacent to the building to locate a first burning ember having a risk of burning the building; energizing a laser light emitter to emit laser light; and directing emitted laser light on the ember for a period sufficient to neutralize the ember.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Various embodiments provide a static structure or a system that includes provisions that help with fire prevention. Specifically, the various embodiments include features that help prevent alighted materials from settling on or near the static structure. This is accomplished by depleting the available fuel of the alighted material before it settles on the static structure.

Figure 1:
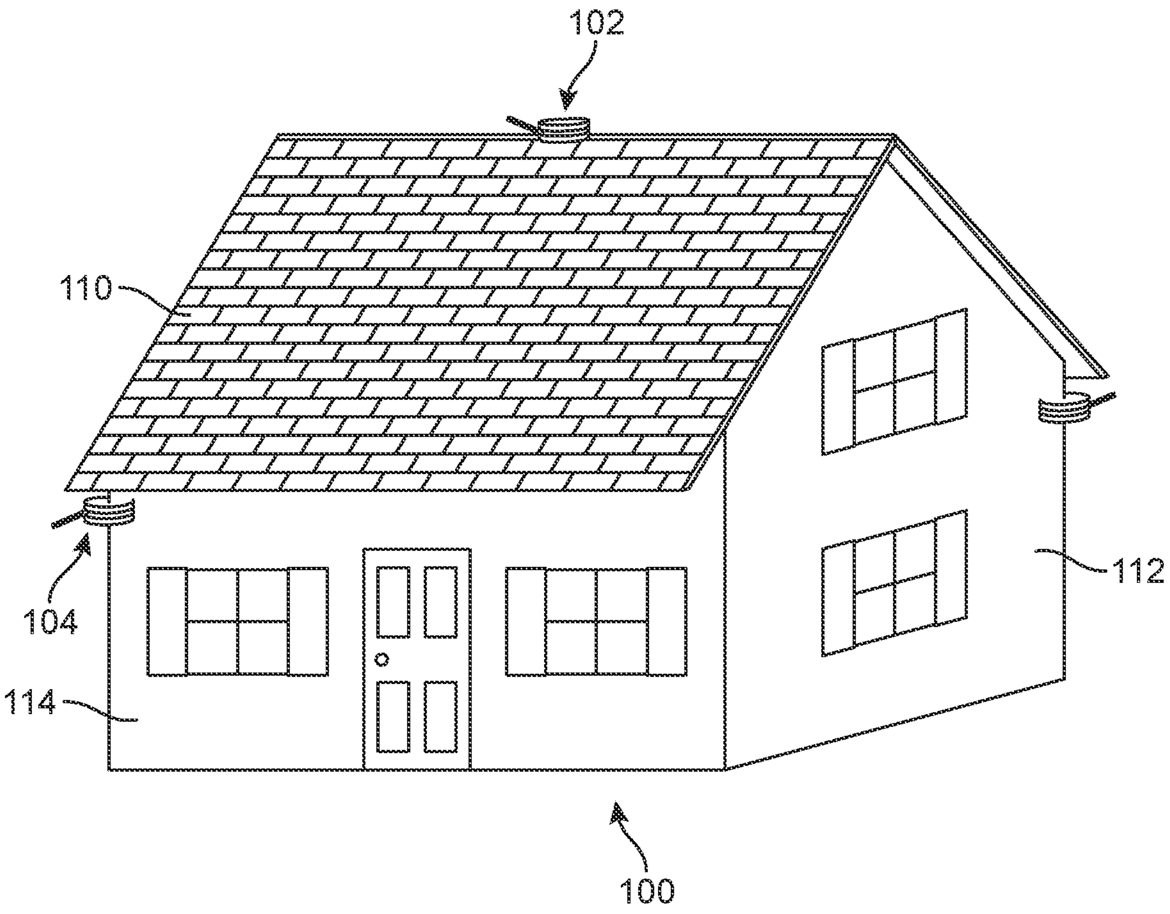
FIG. 1 is a schematic diagram of an embodiment of a static structure.

Referring to FIG. 1, static structure 100 is shown. Solely for purposes of illustration, static structure resembles a detached, single family dwelling. Static structure 100 could be any kind of static structure including a residential building or a commercial building. Examples of residential buildings include townhomes or row houses, apartment buildings, condominiums, multi-family dwellings, and detached single family homes. Examples of commercial buildings include office buildings, government buildings, retail developments, houses of worship, healthcare facilities, warehouses, storage facilities, and financial institutions. Principles and features of the present invention may be applied to any kind of static structure.

As shown in FIG. 1, static structure 100 may include one or more laser turrets. In the embodiment shown in FIG. 1, static structure 100 includes a roof turret 102 disposed centrally on roof 110 of static structure 100. The example shown in FIG. 1 shows roof turret 102 being located centrally on roof 110. FIG. 1 just shows an example, roof turret 102 may be placed in any suitable location on roof 110, including peripheral portions or on the edge of roof 110. Also, roof turret 102 is an optional feature. Some embodiments of static structure 100 may include a roof turret, while other embodiments of static structure 100 may exclude a roof turret. In some cases, static structure 100 may include multiple roof turrets.

Some embodiments may optionally include first side turret 104. First side turret 104 may be placed on a first side wall 112 of static structure 100. As shown in FIG. 1, first side wall 112 is a structure that is generally vertically disposed and may be connected to roof 100. Like roof turret 102, first side turret 104 is an optional feature. Some embodiments of static structure 100 may include a first side turret, while other embodiments of static structure 100 may exclude a first side turret. In some cases, first side turret 104 may be disposed on a corner of first side wall 112. Some embodiments may optionally include second side turret 106. Second side turret 106 may be placed on a second side wall 114 of static structure 100. As shown in FIG. 1, second side wall 114 is a structure that is generally vertically disposed and may be connected to roof 100. In the embodiment shown in FIG. 1, second side wall 114 is distinct from first side wall 112. Like roof turret 102, second side turret 106 is an optional feature. Some embodiments of static structure 100 may include a second side turret, while other embodiments of static structure 100 may exclude a second side turret. Some embodiments may include a combination of two or more turrets selected from roof turrets and side turrets. Some embodiments of static structure 100 may include more than two side turrets.

Figure 2:
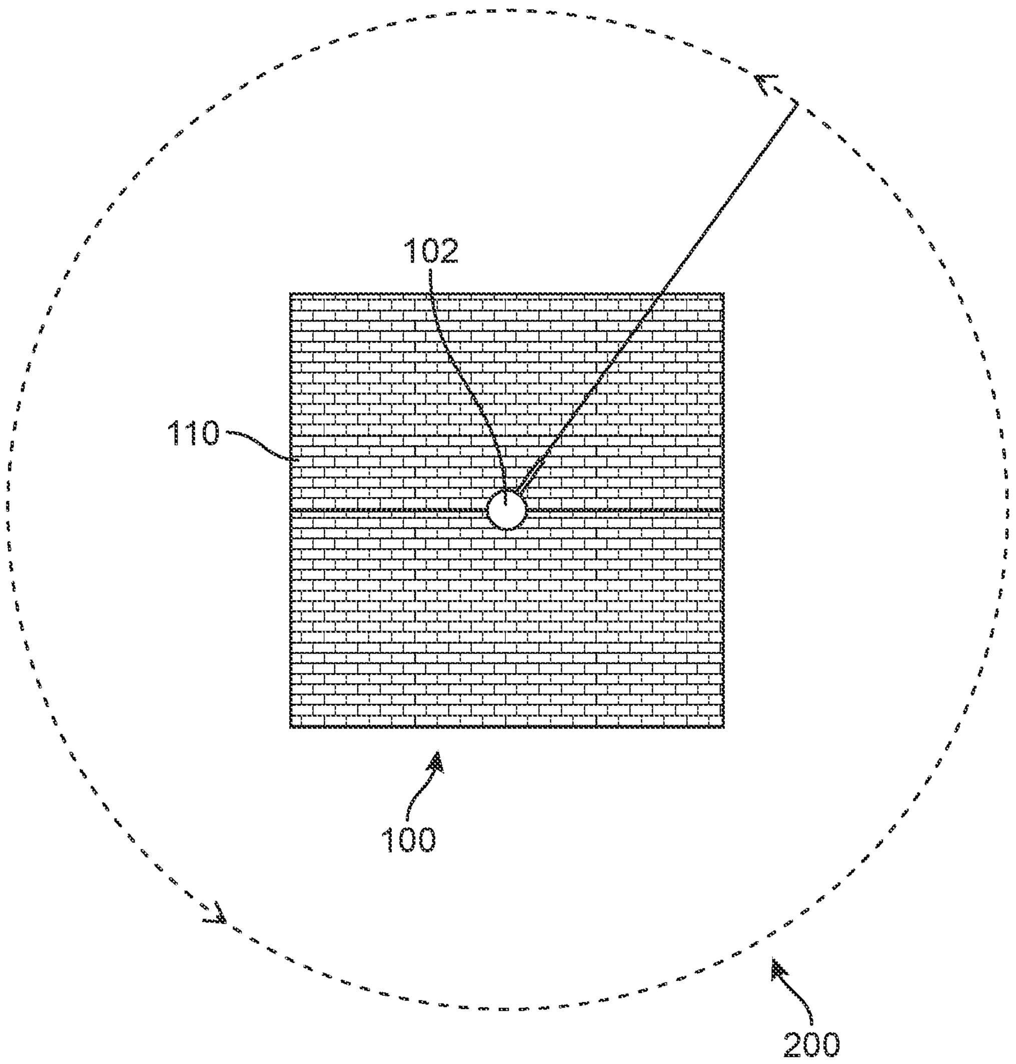
FIG. 2 is a schematic diagram of an embodiment of a roof turret of static structure.

FIG. 2 is a schematic diagram of an embodiment of roof turret 102. In this embodiment, roof turret 102 is centrally located on roof 110 and at a peak of roof 110. This position provides roof turret 102 with a 360° arch sweep or arch coverage. From this position, roof turret 102 is capable of directing a laser beam to a target approaching from any direction.

Figure 3:
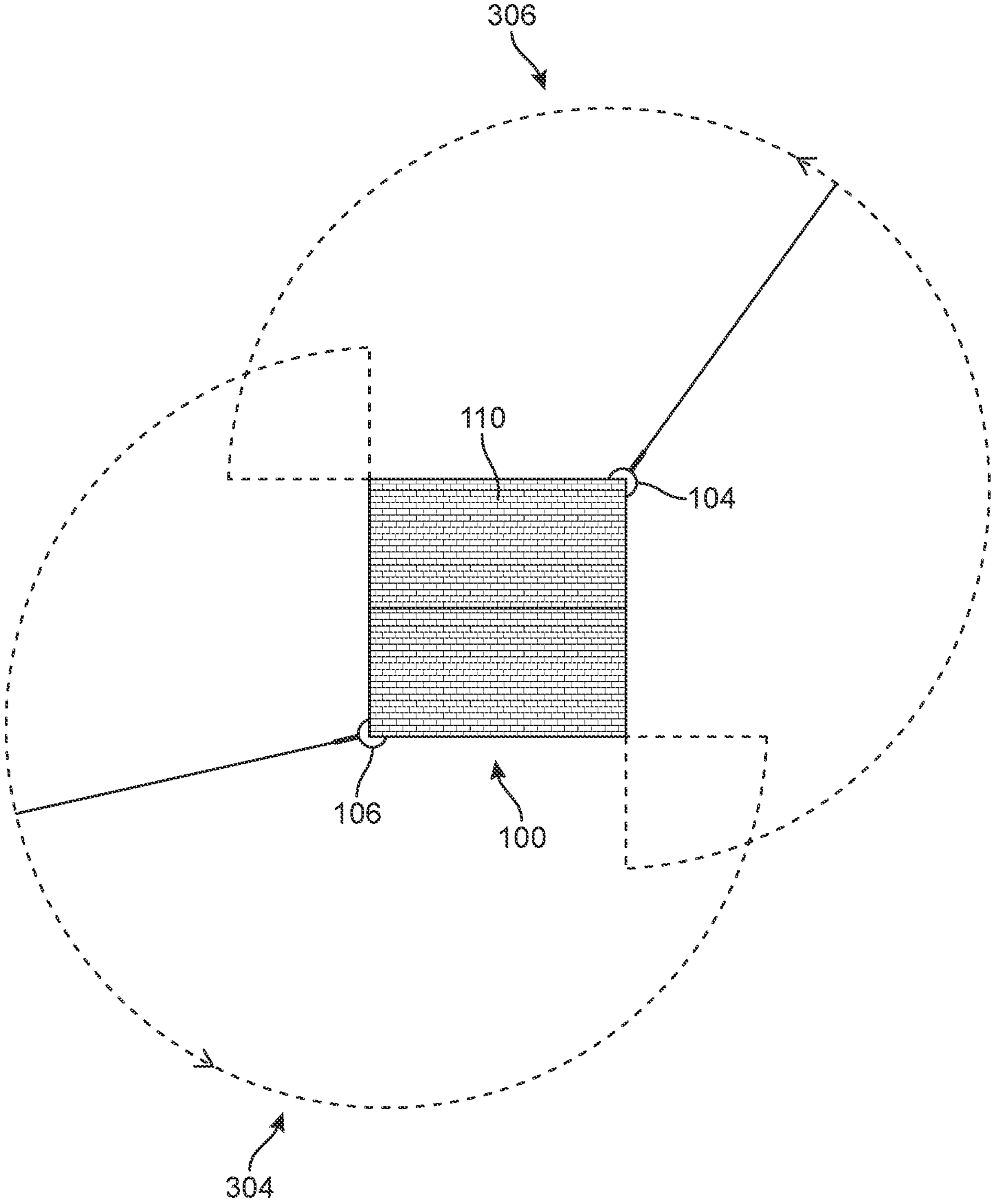
FIG. 3 is a schematic diagram of an embodiment of side turrets of static structure.

FIG. 3 is a schematic diagram of an embodiment of the placement of first side turret 104 and second side turret 106. In this embodiment, first side turret 104 has an arch sweep or arch coverage of about 270°. First side turret 104 is unable to engage targets in defilade behind static structure 100. This results in a 90° segment obscured by static structure 100. Similarly, second side turret 106 also has an arch sweep or arch coverage of about 270°. Second side turret 106 is unable to engage targets in defilade behind static structure 100. This results in a 90° segment obscured by static structure 100. In the embodiment shown in FIG. 5, the two side turrets are disposed on opposite corners of static structure 100 so that the two side turrets working in combination will provide 360° coverage, with a couple of overlapping fields of fire.

Some embodiments include provisions for directing a laser to a particular ember or incoming target. These embodiments can include the following optional steps of tracking one or more embers, selecting a particular ember, and servicing the selected ember. After this sequence has been completed, some embodiments may repeat the tracking, selecting and servicing sequence. An embodiment of a method for directing a laser at a particular ember is shown in FIG. 4.

Figure 4:
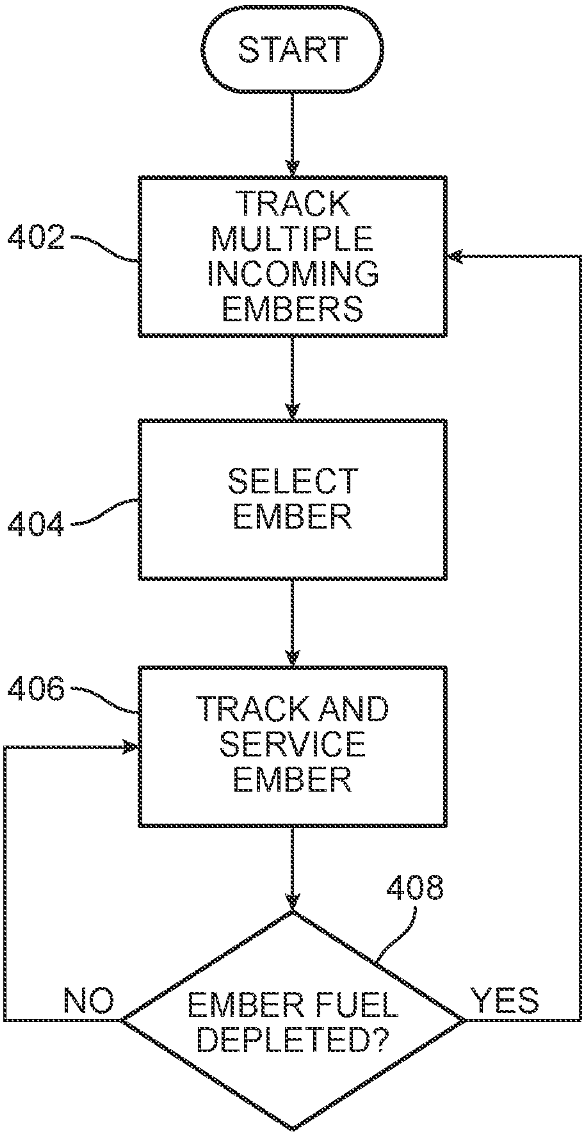
FIG. 4 is a schematic flow diagram of a method for selecting and servicing a target, according to an embodiment.
Figure 5:
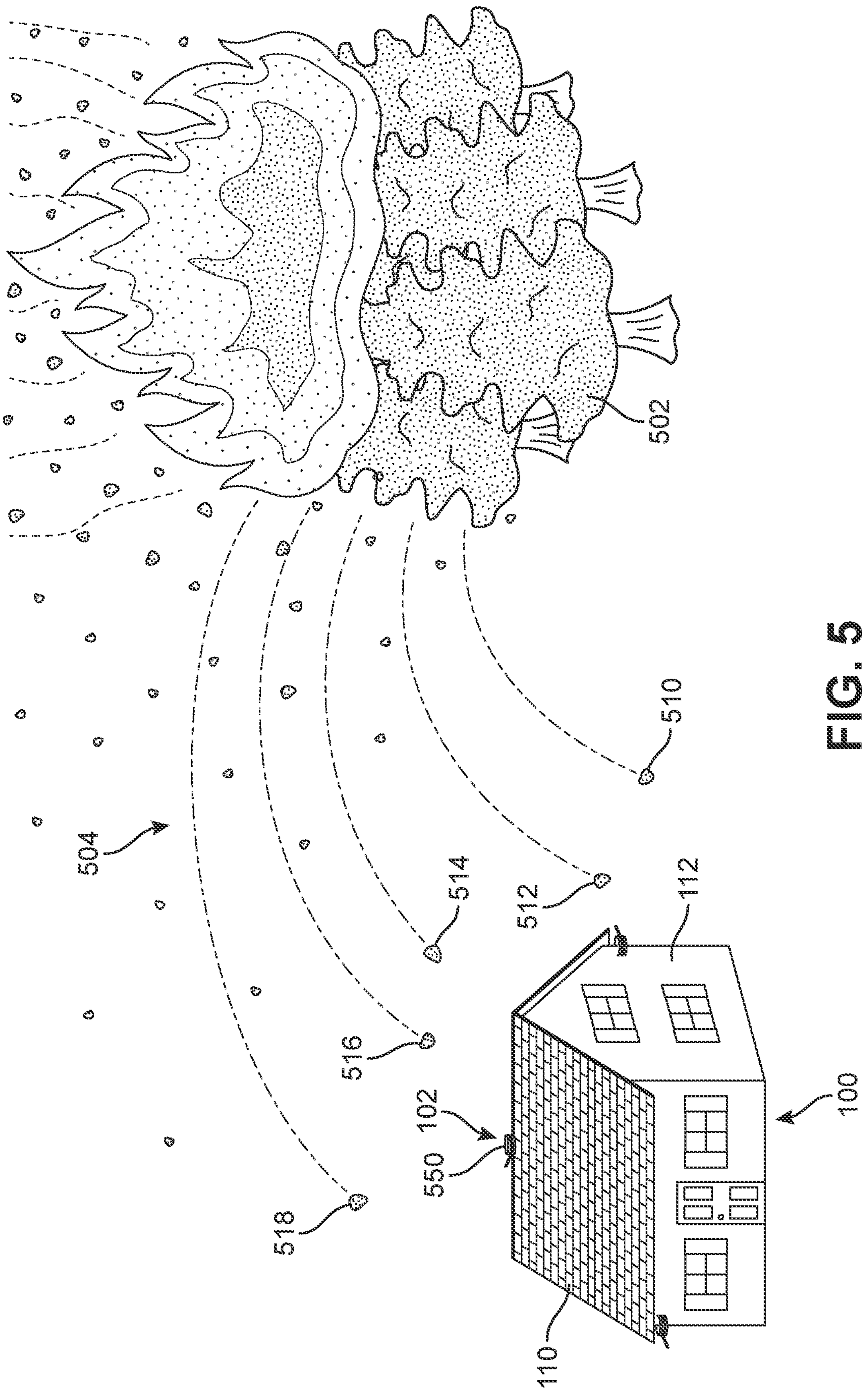
FIG. 5 is a schematic diagram of a fire in close proximity to a static structure, in according to an embodiment.
Figure 6:
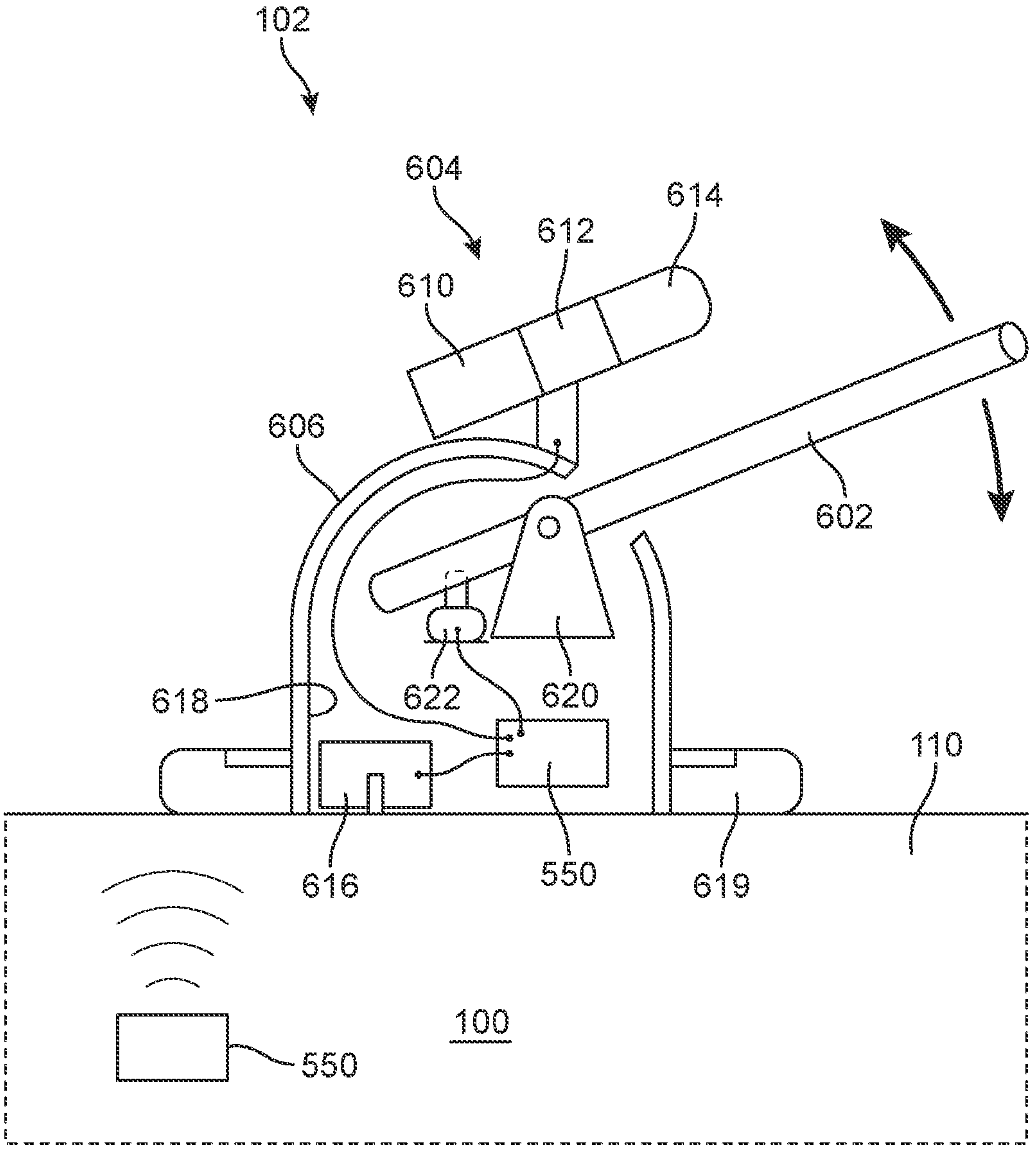
FIG. 6 is a schematic diagram of an embodiment of a laser turret.

Referring to FIG. 4, the method can begin with step 402, where a laser control system tracks multiple incoming embers. Referring to FIG. 5, a fire 502 close in proximity to static structure 100, produces multiple embers 504. Laser control system 550, either disposed within laser turret 102 or in communication with laser turret 102, may track incoming embers 504. Referring to FIG. 6, which is a schematic diagram of an embodiment of a laser turret 102, laser turret 102 may include a sensor array 604. Sensor array 604 may optionally include a reflecting sensor 610, an optical sensor 612, and a thermal sensor 614.

Referring to FIGS. 4-6, laser control system 550, using sensor array 604, may track multiple incoming embers 504. In some embodiments, laser control system 550 determines a predicted flight path of each ember by using the ember's current estimated velocity and direction. In the embodiment shown in FIG. 4, first ember 510 is estimated to have insufficient velocity and trajectory to approach static structure 100. Likewise, second ember 512 is also estimated to have insufficient velocity and trajectory to contact or settle on static structure 100. Laser control system 550 calculates that fifth ember 518 has a velocity and trajectory that is likely to overshoot static structure 100 and laser control system 550 has determined that fifth ember 550 is unlikely to contact or settle on static structure 100.

Unlike the other embers, third ember 514 and fourth ember 516 have been determined by laser control system 550 to present a velocity and trajectory profile that makes both third ember 514 and fourth ember 516 likely to either contact or settle on static structure 100. This determination by laser control system 500 of selecting particular embers that are likely to contact or settle on static structure 100 may form part of method step 404, where the laser control system 550 selects a particular ember. In some embodiments, this initial analysis of determining which embers are likely to contact static structure 100 may be used to distinguish embers that pose a risk to static structure 100 from embers that do not pose a risk to static structure 100.

In addition, in some embodiments, laser control system 550 may prioritize embers that are likely to settle on the roof 110 of static structure 100 over embers that are likely to contact a side wall 112 of static structure 100. Embers that settle on roof 110 of static structure 100 may present an enhanced risk because those embers could have a longer opportunity, in terms of time, to ignite roof 110 of static structure 100. So laser control system 550 may use a second distinction between those embers that are likely to settle on the roof 110 versus those embers that may contact a side wall 112 of static structure 100. These distinctions may be used by laser control system 550 to prioritize and select particular embers for service.

In the embodiment shown in FIG. 4, laser control system 550 has calculated, based on velocity and trajectory, that third ember 514 is likely to strike side wall 112 of static structure 100. Laser system 550 has also calculated that fourth ember 516 is likely to settle on roof 110 of static structure 100. Using just a calculated travel path for the embers, laser control system 550 may prioritize the fourth ember 516 for initial service. However, in some embodiments, laser system 550 may use additional factors to select the initial ember for service.

Another factor that may be considered is an associated thermal signature of the ember. For example, embers with very high thermal signatures may indicate a relatively larger ember with relatively larger quantities of fuel available for combustion. Fuel being one of the elements of the fire triangle. The other elements of the fire triangle being heat and an oxidizer. In the context of the present invention, the oxidizer will most likely be ambient atmospheric oxygen. And the fuel will most likely be wood fuel. In some embodiments, laser control system 550 may include the thermal signature of an ember as a factor or consideration in determining priority. For example, in some cases, once the embers have been sorted between three categories: (1) likely to miss static structure 100, (2) likely to contact side wall of static structure, and (3) likely to settle on roof of static structure, then laser control system 550 can further prioritize those embers in the third group (likely to settle on roof) by thermal signature. In this example, laser control system 550 will select the “brightest” or “hottest” ember, the ember with the highest thermal signature, among the embers that are likely to settle on the roof of the static structure for priority service.

FIG. 6 is a schematic diagram of an embodiment of laser turret 102. Laser turret 102 includes laser emitter 602 mounted on turret 606. Turret 606 may be mounted onto static structure 100, and include provisions that permit waist rotation so that turret 606 may rotate with respect to static structure 100. In the embodiment shown in FIG. 6, rotating motor 616 drives inner wall 618 of turret 606 to provide waist rotation of turret 606. In some embodiments, inner wall 618 and rotating motor 616 may include gears, teeth, splines or other engaging and cooperating surfaces. Some embodiments of turret 606 may include a bearing 619 that helps to facilitate waist rotation of turret 606 about static structure 100.

Turret 606 may also include provisions that permit laser emitter 602 to elevate and depress with respect to static structure 100. In the embodiment shown in FIG. 6, turret 606 includes fulcrum 620 and powered actuator 622. Powered actuator 622 is capable of pivoting laser emitter 602 about fulcrum 622. This allows laser control system 550 to control the elevation and depression of laser emitter 602. Laser turret 102 may also include provisions to detect and track incoming embers. Any desired sensor or device may be used to detect and track incoming embers. In the embodiment shown in FIG. 6, laser turret 102 includes sensor array 504.

As discussed above, Sensor array 604 may optionally include a reflecting sensor 610, a camera sensor 612, and a thermal sensor 614. A reflecting sensor 610 is any type of sensor that emits an electromagnetic signal and detects a corresponding reflected signal. Examples of reflecting sensors include RADAR, SONAR, and LIDAR. The use of a reflecting sensor is optional. Camera sensors refer to a broad variety of sensors that are capable of detecting viable and non-visible light. Examples of camera sensors include Charged Coupled Devices (CCDs), Time of Flight sensors, CMOS image sensor, Structured Light Sensors, or any other sensor that can detect visible and non-visible light. Thermal sensor 614 is generally a sensor capable of detecting the relative temperature and emissivity of a distant object. Generally, an Infrared (IR) sensor may be used as a thermal sensor.

Laser control system 550 may receive information from sensor array 604 and provide signals to various cooperating elements of turret 606 to control the operation of laser emitter 602. In some embodiments, laser control system 550 may be disposed within turret 606, as shown in FIG. 6. In this embodiment, sensor array 604 may communicate with laser control system 550 using physical wiring. Laser control system 550 may also communicate with rotating motor 616 and powered actuator 622 using physical wiring to direct laser emitter 602 in the desired direction. In other embodiments, laser control system 550 may be spaced from turret 606. In these embodiments, laser control system 550 may receive information from sensor array 604 wirelessly. Laser control system 550 may also send control signals wirelessly to various elements, like rotating motor 616 and powered actuator 622.

Figure 9:
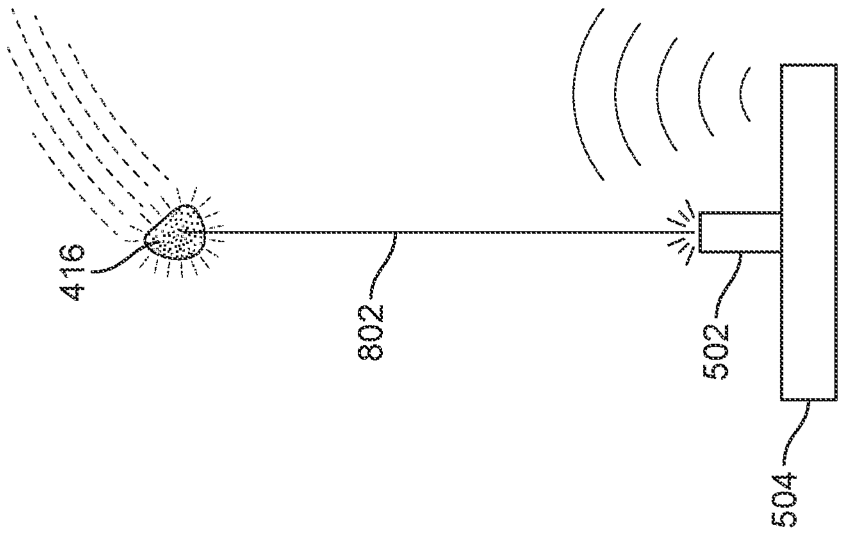
FIG. 9 is a schematic a laser turret engaging an incoming ember, according to an embodiment.
Figure 8:
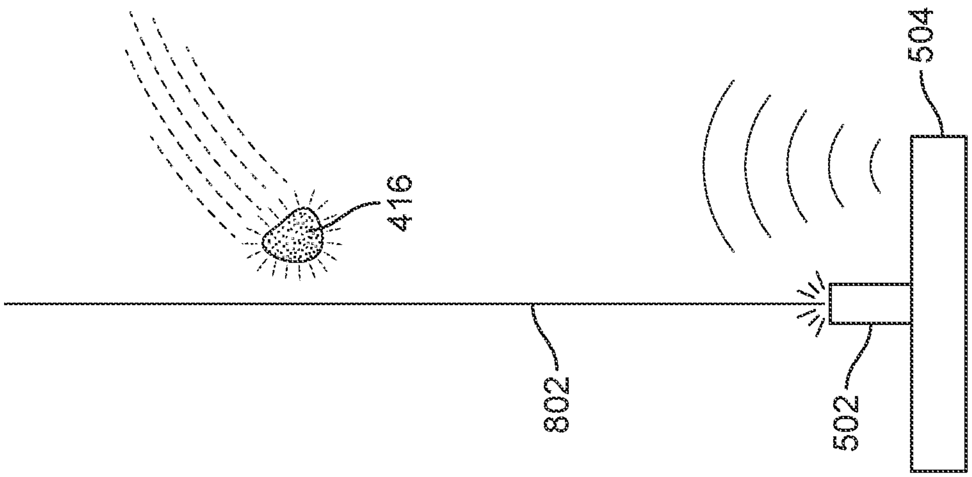
FIG. 8 is a schematic a laser turret directing energy towards an incoming ember, according to an embodiment.
Figure 7:
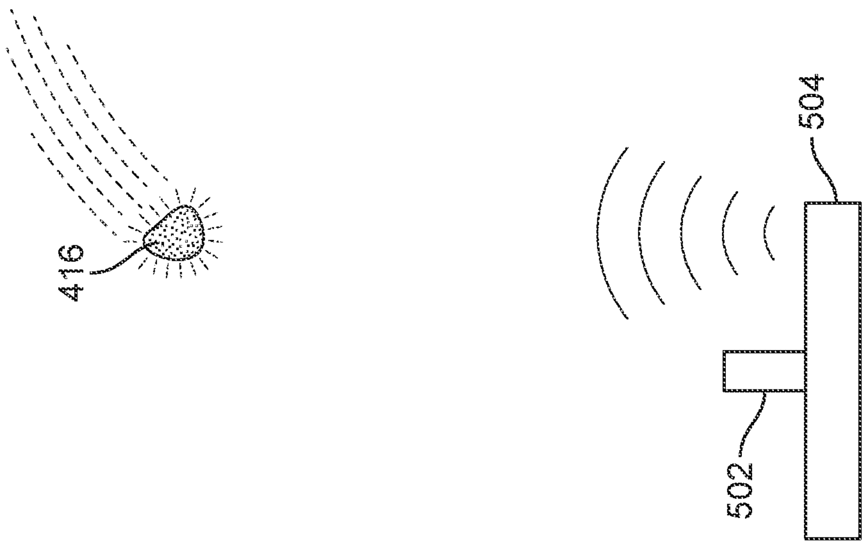
FIG. 7 is a schematic diagram of a laser turret tracking an incoming ember, according to an embodiment.

FIGS. 7-9 show an embodiment of laser control system 550 targeting, tracking and servicing an incoming ember 416. In FIG. 7, laser control system 550 has determined fourth ember 416 for priority service. In some embodiments, thermal sensor 614 may be used to initially target or aim laser emitter 502 towards fourth ember 416. This may be advantageous because thermal sensor 614 may have been used to initially track and prioritize incoming targets. This persistent engagement with the potential target may allow thermal sensor 614 to provide an immediate firing solution to laser control system 550. In other embodiments, reflecting sensor 610 may be used to initially target or aim laser emitter 502 towards fourth ember 416. In some embodiments, both thermal sensor 614 and reflecting sensor 610 may be used in combination to initially target fourth ember 416.

In FIG. 8, laser control system 550 orders laser emitter 502 to emit laser beam 802 at fourth ember 416. Camera sensor 612 may be used to determine if laser beam 802 has successfully contacted fourth ember 416. In the embodiment shown in FIG. 8, laser beam 802 has missed fourth ember 416. This miss may be captured by camera sensor 612, and this information may be provided to laser control system 550. In some embodiments, camera sensor 612 may be used to correct the aim of laser emitter 502. In some cases, camera sensor 612 may continuously track and correct the aim of laser emitter 502.

Referring to FIG. 9, based on the received optical information from camera sensor 612, laser control system 550 may correct the aim of laser emitter 502 until corrected laser beam 902 contacts fourth ember 416. Camera sensor 612 may be used to continuously track fourth ember 416 during flight, and camera sensor 612 may be used to continuously correct the aim of laser emitter 502 so that corrected laser beam 902 remains in contact with fourth ember 416 as the fourth ember 416 continues along its trajectory.

While corrected laser beam 902 remains in contact with fourth ember 416, corrected laser beam 902 services fourth ember 416 by irradiating fourth ember 416 with directed electromagnetic energy. This additional energy is used to accelerate the consumption of fuel contained within fourth ember 416. In other words, laser beam 902 is intended to rapidly burn any remaining fuel in fourth ember 416, thus depleting the fuel supply of fourth ember 416. Ideally, the fourth ember 416 would be depleted of its fuel by corrected laser beam 902 prior to contacting static structure 100. When fourth ember 416 has been depleted of its fuel, fourth ember 416 would likely generate far less heat and would be much less likely to ignite static structure 100 even if the depleted fourth ember settled on the roof 110 of static structure 100.

Figure 10:
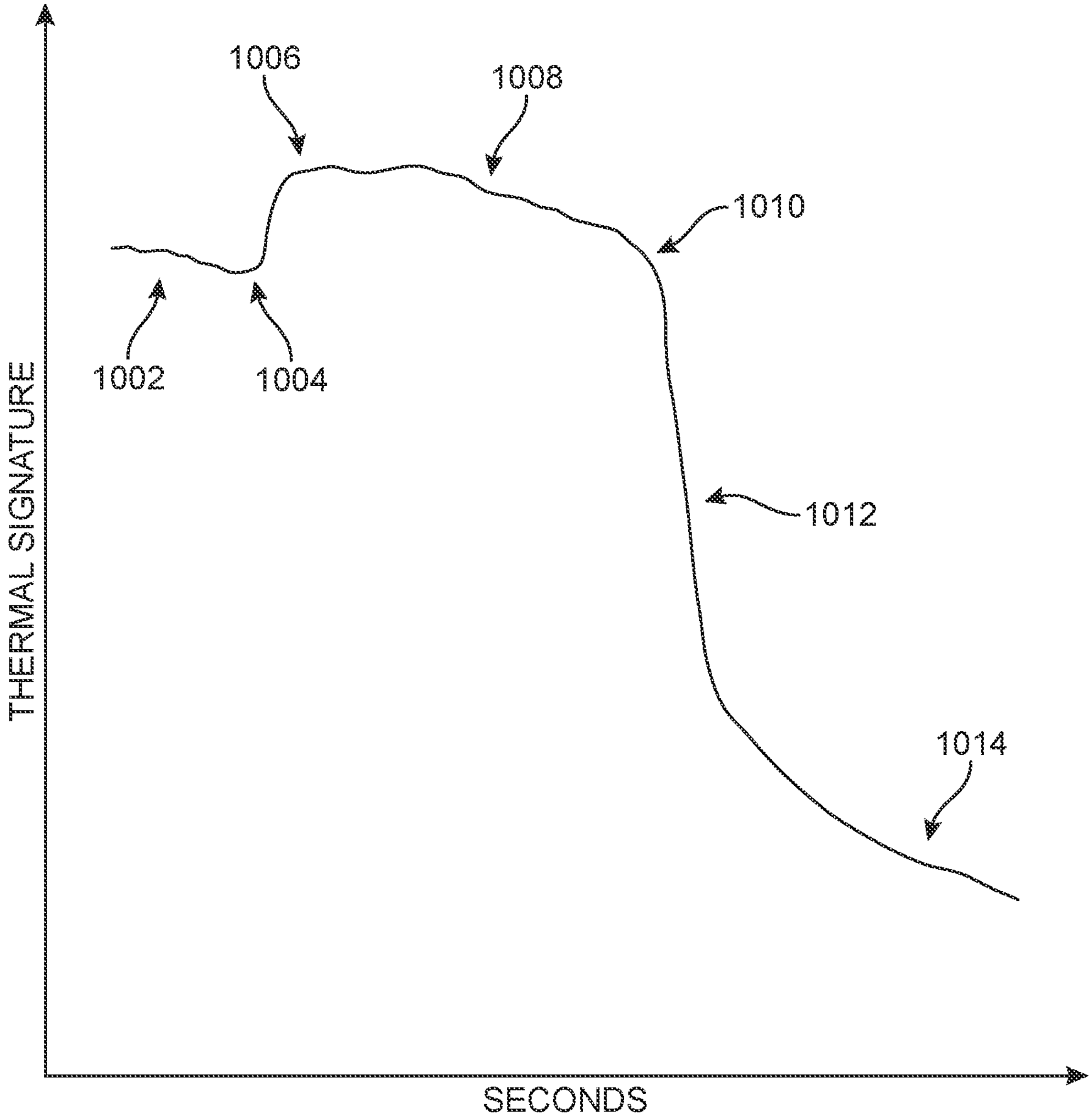
FIG. 10 is a graph of the thermal signature of an ember over time, according to an embodiment.

Some embodiments can include provisions for determining when an ember has been depleted and the next ember in order of priority may be targeted. Referring to FIG. 10, which shows an embodiment of a graph of an ember's thermal signature over time, certain criteria may be used to shift from targeting one ember to another. In FIG. 10, the X-axis is time in seconds and the Y-axis is the thermal signature of ember 416. Ember 416 starts with an initial thermal signature 1002. This thermal signature may have a slight decay pattern as shown in FIG. 10. An embodiment of this condition is shown in FIG. 8. A laser contacts fourth ember 416 at 1004. An embodiment of this situation is shown in FIG. 9. The laser may increase the heat of fourth ember 416 and increase its thermal signature to 1006. The laser continues to contact the fourth ember 416 and burn its remaining fuel in region 1008. At some point, the fuel of fourth ember 416 becomes depleted at 1010. This causes a rapid decline in the thermal signature of fourth ember 416, as shown in region 1012.

The depletion of fuel at 1010 causes a discontinuity of the thermal signature. In the embodiment shown in FIG. 10, the laser burn phase in region 1008 produced a somewhat constant or slightly declining thermal signature. However, once the fuel has been depleted, as shown in region 1010, a rapid decline in the thermal signature can be observed in region 1012. If burn region 1008 and rapid decline region 1012 are modeled linearly, the slope of burn region 1008 would be different than the slope of rapid decline region 1012. In one embodiment, the discontinuity between burn region 1008 and rapid decline region 1012 may be expressed as a difference in the slope of those regions, with the rapid decline region having a significantly more negative slope than the burn region. It can also be observed that the discontinuity occurs when the fuel has been depleted in region 1010.

In some embodiments, these observations are used to determine when a currently serviced ember has been depleted of fuel and the next ember, in terms of priority, may be targeted and serviced. In some cases, an observed discontinuity in the thermal signature of an ember may be used to infer or determine that the currently targeted ember has been depleted of fuel. In this embodiment, laser control system 550 may continue to track and service an ember until a discontinuity in that ember's thermal signature is observed by laser control system 550. Once that discontinuity has been observed, laser control system 550 determines the next ember, in terms of priority, and disengages from the depleted ember to engage the next ember. This process may be repeated until all embers that pose an ignition risk to static structure 100 have been serviced and depleted.

Figure 11:
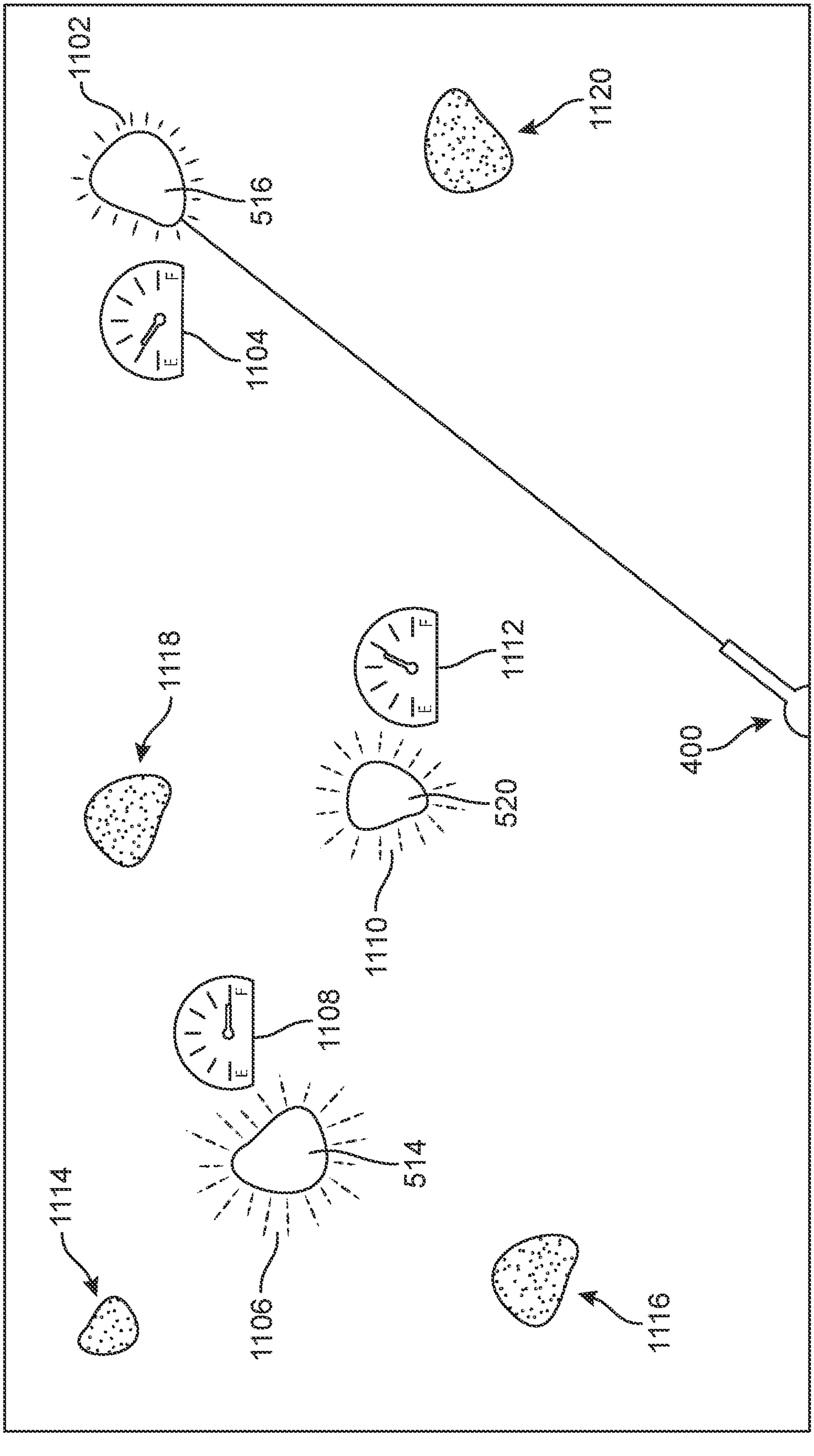
FIG. 11 is a schematic diagram of a group of incoming embers and a laser turret, according to an embodiment.
Figure 12:
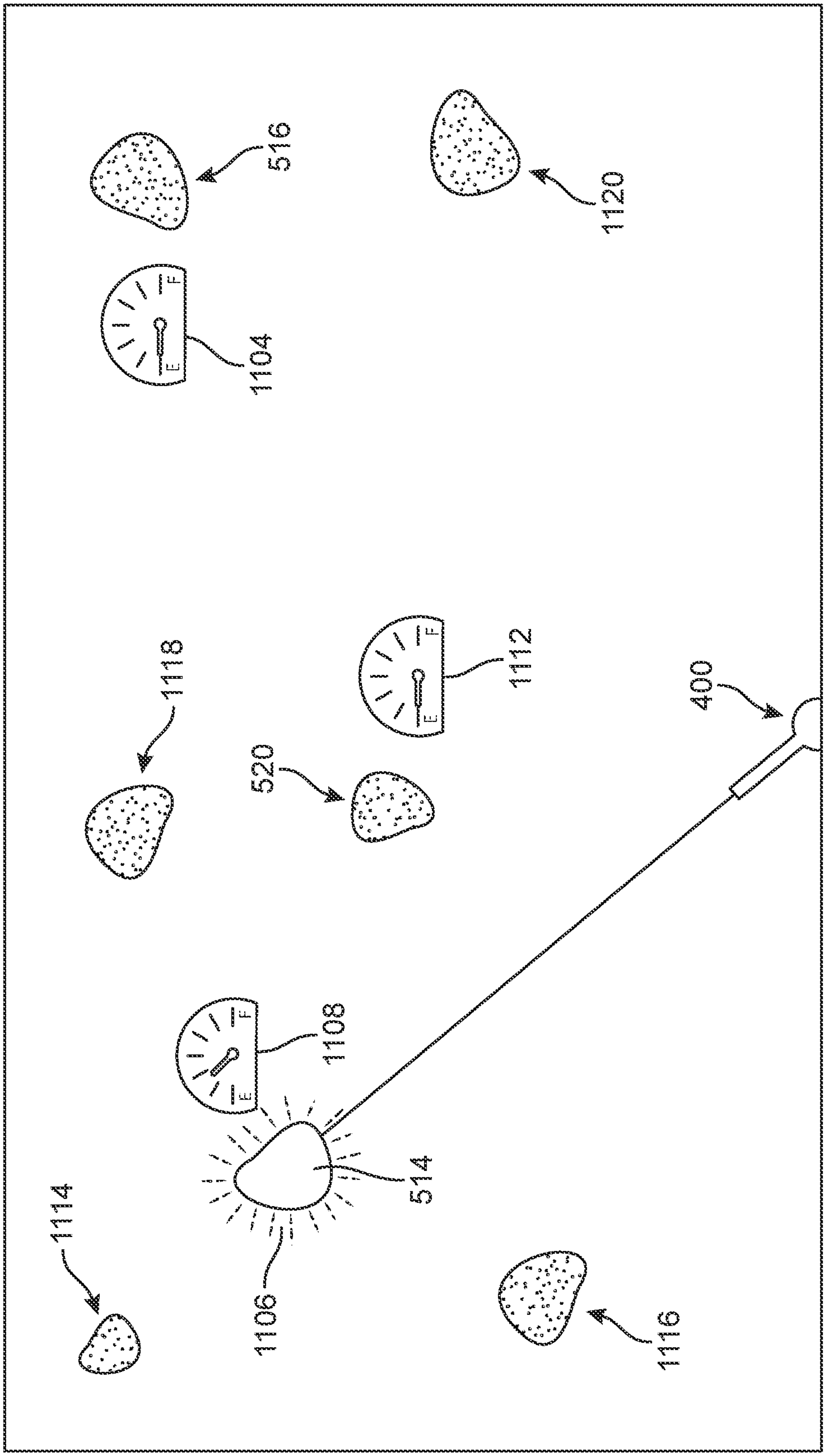
FIG. 12 is a schematic diagram of a group of incoming embers and a laser turret, according to an embodiment.
Figure 13:
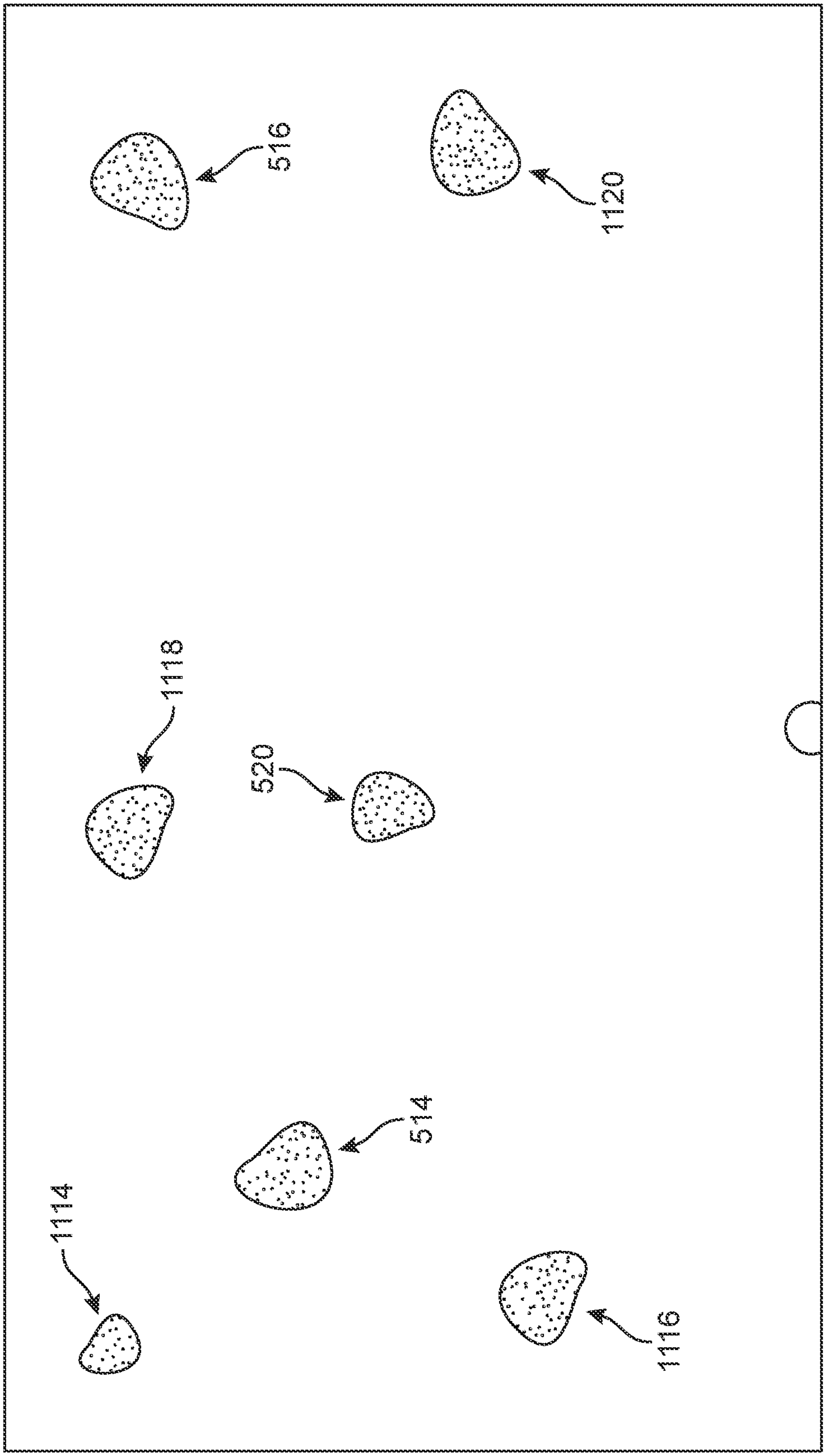
FIG. 13 is a schematic diagram of a group of incoming embers and a laser turret, according to an embodiment.

An embodiment of this method or sequence is shown in FIGS. 11-13. Referring to FIGS. 11-13, a group of oncoming embers is shown. Fourth ember 516 includes fourth thermal signature 1102 and a fourth fuel level 1104. In FIGS. 11-13, fourth fuel level 1104 is shown schematically as a gasoline gauge, which represents a quantity of unburned hydrocarbons, most likely wood fuel, associated with fourth ember 516. Third ember 514 is also shown, having a third thermal signature 1106 and its associated third fuel level 1108. Sixth ember 520 (not shown in FIG. 5) is also shown, having sixth thermal signature 1110 and also having a sixth fuel level 1112 that represents a quantity of unburned hydrocarbons contained within sixth ember 520. A number of other embers are also shown. Seventh ember 1114, eighth ember 1116, ninth ember 1118 and tenth ember 1120 are also shown. These embers have already depleted their corresponding fuel levels and do not produce a significant thermal signature.

Given this collection of incoming embers, embodiments of the present invention may operate to prioritize and service those embers that pose a fire risk to static structure 100. Referring to FIGS. 4 and 6, laser control system 550 may track these incoming embers, as shown in step 402. According to one embodiment, laser control system 550 may select a particular ember for initial service, as shown in step 404. In this case, the ember with the highest thermal signature is selected for initial service. Recall that other embodiments may optionally include the velocity and trajectory of the ember in the ember selection process.

In the embodiment shown in FIG. 11, fourth ember 516 has the "brightest" thermal signature 1102, which causes laser control system 550 to select the fourth ember 516 for initial service. Laser control system 550 maneuvers and guides laser emitter 502 towards fourth thermal signature 1102 and services fourth ember 516. The optical adjustment and correction steps shown in FIGS. 7-9 may optionally be utilized to enhance the accuracy of laser emitter 502.

After fourth ember 516 has been sufficiently depleted, laser control system 550 may select the next target ember for service. This situation is shown in FIG. 12. In the embodiment shown in FIG. 12, third ember 514 has the next highest or "brightest" thermal signature 1106. This causes laser control system 550 to select the third ember 514 for subsequent service. Laser control system 550 shifts the aim of laser emitter 502 from fourth ember 516 to third ember 514, and commands laser emitter 502 to direct laser energy towards third ember 514. Again, the optical adjustment and correction steps shown in FIGS. 7-9 may optionally be utilized to enhance the accuracy of laser emitter 502 as it services third ember 514. The laser energy accelerates the dissipation of the third ember's 514 corresponding fuel level 1108. Eventually, third fuel level 1108 becomes depleted and third ember 514 experiences a significant drop in thermal signature.

Meanwhile, sixth ember 520 which initially had the third brightest thermal signature 1110 (see FIG. 11) after the thermal signatures the fourth and third embers, has burn out on its own without any intervention. Note that in FIG. 12, the sixth fuel level 1112 has become depleted while the third ember 514 was being serviced. FIG. 13 is an embodiment of the situation after the third ember 514 has been serviced. In this embodiment, all of the incoming embers have been neutralized and depleted of fuel. Their lack of fuel prevents those embers from supporting further combustion or fire. This situation can also be observed in step 408 (See FIG. 4) where the ember fuel has been depleted and the system returns to step 402, waiting to track any new incoming embers. FIGS. 1-13 show an embodiment of the system engaging an incoming group of embers. After this engagement has concluded, the system may wait at step 402 (See FIG. 4) for any new incoming embers and repeat the process again and again until the threat from incoming embers has been fully mitigated. Eventually, the desired goal would be to deplete the fuel of all incoming embers that pose a threat so that none of the incoming embers presents a significant risk of igniting static structure 100, and the overall threat from embers has been mitigated by using the principles and features disclosed with the various embodiments.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A static structure including a laser system comprising:

at least two vertically disposed side walls, the side walls being angled with respect to one another;

a roof supported by the two side walls and generally disposed above the two side walls;

a laser system including a laser turret;

the laser turret being disposed on the roof of the static structure;

the laser system including a sensor array and a laser emitter configured to dispense laser energy;

the laser turret also including a control system configured to move the laser emitter;

a laser control system receiving information from the sensor array and sending signals to the control system to move the laser emitter;

wherein the laser control system selects an incoming ember based on a thermal signature associated with the incoming ember, and wherein the laser control system issues commands to the control system to direct the laser emitter towards the incoming ember, and wherein the laser emitter directs laser energy at the incoming ember; and wherein the laser control system uses a camera sensor of the sensor array to correct the direction of the laser emitter to follow the incoming ember while the incoming ember moves, after the incoming ember has been initially acquired by the thermal signature associated with the incoming ember.

2. The static structure according to claim 1, wherein the laser control system tracks multiple incoming embers and calculates a velocity and trajectory of each of the incoming embers.

3. The static structure according to claim 1, wherein the laser control system determines that a fuel level associated with the incoming ember has been depleted by sensing a discontinuity in the thermal signature of the incoming ember.

4. The static structure according to claim 1, wherein the laser control system determines that a fuel level associated with the incoming ember has been depleted by sensing a rapid decline in the thermal signature of the incoming ember.

5. The static structure according to claim 1, wherein the laser turret includes a rotating motor that rotates the laser turret with respect to the static structure.

6. The static structure according to claim 1, wherein sensor array includes a camera sensor and a reflecting sensor.

7. A static structure including a fire mitigation system comprising:

at least two vertically disposed side walls, the side walls being angled with respect to one another;

a roof supported by the two side walls and generally disposed above the two side walls;

a laser system including a laser turret;

the laser turret being disposed on the static structure;

the laser system including a sensor array and a laser emitter configured to dispense laser energy;

the laser turret also including a control system configured to move the laser emitter;

a laser control system receiving information from the sensor array and sending signals to the control system to move the laser emitter;

wherein the laser control system tracks multiple incoming embers and calculates a velocity and trajectory of each of the incoming embers, the laser control system selecting at least one priority ember likely to contact the static structure for initial service, and wherein the laser control system directs laser energy at the priority ember.

8. The static structure according to claim 7, wherein the laser control system continues to direct laser energy at the priority ember until a fuel level associated with the priority ember has been depleted.

9. The fire protection system of claim 8, wherein the fire protection system controller further comprises a light sensor to locate embers.

10. The fire protection system of claim 8, wherein the switch is adapted to separately activate selected laser light emitters.

11. The fire protection system of claim 10, wherein a first laser light emitter is aimed at and tracks the first ember.

12. The fire protection system of claim 11, wherein a second laser light emitter is aimed at and tracks the first ember.

13. The fire protection system of claim 8, wherein the controller is adapted to locate and track with emitted laser light from a first laser light emitter an ember presenting greatest risk to the building to neutralize the ember.

14. The fire protection system of claim 13, wherein the controller is further adapted to track with emitted laser light from a second laser light emitter an ember presenting greatest risk to the building to neutralize the ember.

15. A method for neutralizing embers that may burn a building, the method comprising:

scanning a region adjacent to the building to locate a first ember and a second ember both having a risk of burning the building;

selecting an ember having the greater risk of burning by using a velocity and trajectory of the ember;

tracking the ember selected to have the greater risk of burning the building; and energizing a laser light emitter to emit laser light;

directing emitted laser light on the ember for a period sufficient to neutralize the ember.

16. The method of claim 15, further comprising a light sensor used to track incoming embers.

17. The method of claim 16, further comprising:

a turret configured to direct emitted laser light on the selected ember.

18. The method of claim 16, further comprising energizing the laser light emitter continuously until all embers are neutralized.

19. The method of claim 17, further comprising energizing the laser light emitter only when the laser is directed at the selected ember, so that the laser is energized discontinuously and is turned off between embers.

20. The method of claim 15, wherein a camera sensor is used to aim the laser light emitter.

* * * * *